US007686640B2

(12) United States Patent
Esposito et al.

(10) Patent No.: US 7,686,640 B2
(45) Date of Patent: Mar. 30, 2010

(54) AUDIO ARRANGEMENT FOR A MOBILE UNIT

(75) Inventors: Richard Esposito, Sayville, NY (US); Robert J. Kowalski, Commack, NY (US)

(73) Assignee: Symbol Technologies, Inc, Holtsville, NY (US)

( * ) Notice: Subject to any disclaimer, the term of this patent is extended or adjusted under 35 U.S.C. 154(b) by 0 days.

(21) Appl. No.: 12/144,131

(22) Filed: Jun. 23, 2008

(65) Prior Publication Data

US 2009/0318008 A1 Dec. 24, 2009

(51) Int. Cl.
*H01R 13/62* (2006.01)

(52) U.S. Cl. ........................................................ 439/367

(58) Field of Classification Search ................. 439/638, 439/653, 637, 70, 74, 367

See application file for complete search history.

(56) References Cited

U.S. PATENT DOCUMENTS

| | | | | |
|---|---|---|---|---|
| 4,368,939 A * | 1/1983 | Foederer | ..................... | 439/594 |
| 4,380,360 A * | 4/1983 | Parmer et al. | ................. | 439/59 |
| 4,397,513 A * | 8/1983 | Clark et al. | ................. | 439/357 |
| 4,538,867 A * | 9/1985 | Wilson et al. | ................. | 439/70 |
| 6,099,354 A * | 8/2000 | Troyan | ....................... | 439/638 |

* cited by examiner

*Primary Examiner*—Jean F Duverne

(57) ABSTRACT

An arrangement includes (a) a housing situating an integrated circuit that includes first contacts and (b) a connector. The housing includes a window which exposes at least a portion of the first contacts. The connector includes second contacts disposed at a first end of the connector. The second contacts removably couple to the first contacts. A second end of the connector is coupled to an output device. The connector establishes an electrical connection for an exchange of multimedia data between the integrated circuit and the output device.

8 Claims, 6 Drawing Sheets

AUDIO ARRANGEMENT FOR A MOBILE UNIT

FIELD OF THE INVENTION

The present invention relates generally to an audio arrangement for a mobile unit. Specifically, the audio arrangement includes a first end directly connecting to an internal circuitry of the mobile unit with a second end coupling to an audio output device.

BACKGROUND

A mobile unit may include a variety of different applications that may be used in a variety of different environments. For example, the mobile unit may include an audio functionality. The mobile unit may include a speaker that plays audio data. The mobile unit may also include a port in which a jack of an audio output device such as a headset may be coupled. The headset may enable private listening of the audio data.

There are different types of the audio arrangement including a port of the mobile unit and the jack of the audio output device. A first type includes a classic bayonet type jack to couple the audio output device to the mobile unit. This design enables the bayonet jack to rotate in a mating shell (i.e., port). However, this design also introduces audio noise such as static which results in poor audio quality. A second type includes a pogo pin type interface to eliminate problems associated with the rotation aspect. This design may be more rugged as well. However, this design still utilizes an external mechanical interconnect point that may cause audio issues and associated customer dissatisfaction.

SUMMARY OF THE INVENTION

The present invention relates to an arrangement which includes (a) a housing situating an integrated circuit that includes first contacts and (b) a connector. The housing includes a window which exposes at least a portion of the first contacts. The connector includes second contacts disposed at a first end of the connector. The second contacts removably couple to the first contacts. A second end of the connector is coupled to an output device. The connector establishes an electrical connection for an exchange of multimedia data between the integrated circuit and the output device.

DETAILED DESCRIPTION

Figure 1:
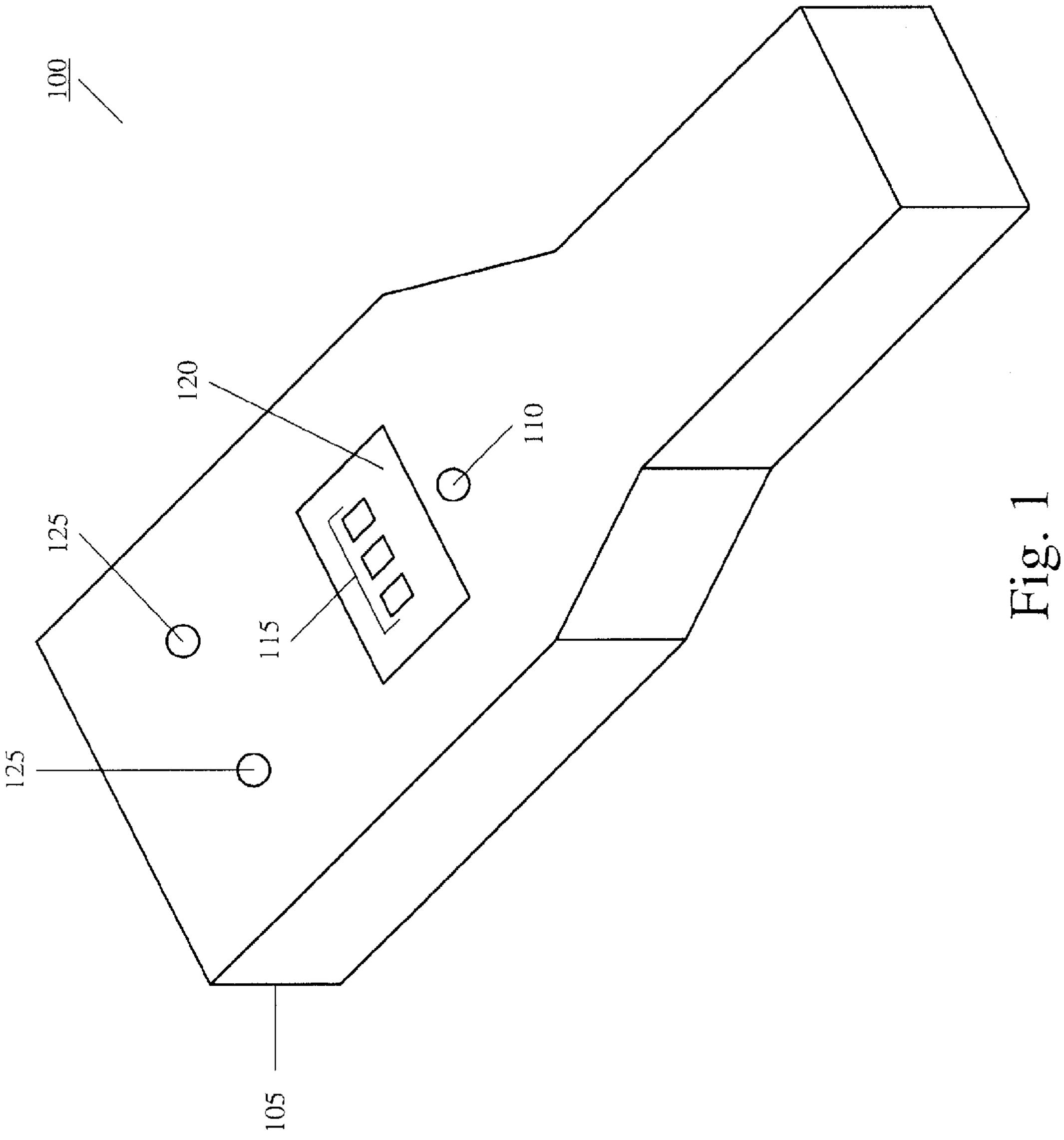
FIG. 1 shows a mobile unit according to an exemplary embodiment of the present invention.

The exemplary embodiments of the present invention may be further understood with reference to the following description and the appended drawings, wherein like elements are referred to with the same reference numerals. The exemplary embodiments of the present invention describe an audio arrangement for a mobile unit (MU). According to the exemplary embodiments of the present invention, the audio arrangement may include a first end directly connecting to an internal circuitry of the MU while a second end couples to an audio output device. The audio arrangement, the MU, and the audio output device will be discussed in further detail below.

It should be noted that the following describes exemplary embodiments related to an audio functionality. However, the use of the audio functionality is only exemplary. The exemplary embodiments of the present invention may generally apply to any further component being coupled to the MU so that a functionality is added, enhanced, or altered. For example, the exemplary embodiments of the present invention may be used for multimedia data, in general, such as video.

FIG. 1 shows an MU 100 according to an exemplary embodiment of the present invention. The MU 100 may be any electronic portable device that includes a multimedia functionality (e.g., audio, video, etc.) such as a mobile computer, a personal digital assistant (PDA), a laptop, a scanner, an RFID reader, an image capturing device, a pager, a cellular phone, etc. It should be noted that the use of the MU 100 is only exemplary. According to the exemplary embodiments of the present invention, the MU 100 may represent any electronic device including stationary devices that include the multimedia functionality (e.g., desktop computer). The MU 100 may include a housing 105, a base lock 110, MU contacts 115, and adapter locks 125.

The housing 105 may at least partially encase components of the MU 100. For example, the MU 100 may include a printed circuit board (PCB), a processor, a memory, a transceiver, a scanning engine, etc. These components may be wholly encased within the housing 105. The MU 100 may also include a display, a data input arrangement (e.g., keypad), etc. These components may be disposed partially within the housing 105 and partially on a periphery of the housing 105. The base lock 110 and the adapter locks 125 may be locking mechanisms that couple with corresponding locking mechanisms. As illustrated in FIG. 1, the base lock 110 and the adapter locks 125 may be, for example, a screw hole to receive a screw. However, it should be noted that the base lock 110 and the adapter locks 125 may be any locking mechanism such as a mechanical lock (e.g., clip), an electrical lock (e.g., solenoid), or a combination thereof. As will be discussed in further detail below, the base lock 110 may be used for a connector and the adapter locks 125 may be used for an adapter.

The MU contacts 115 may be a first set of contacts that couple with a second set of contacts. As will be discussed in further detail below, the MU contacts 115 may couple with contacts for the connector. The MU contacts 115 may be any type of electrical contact such as flat pin heads, extending pogo pins, recesses to receive pogo pins, etc. The MU contacts 115 may be disposed directly on the PCB of the MU 100. Accordingly, the housing 105 may include a window 120 that exposes the MU contacts 115 so that the contacts of the connector may be coupled. It should be noted that the MU 100 may include a cover or lid to protect the MU contacts 115 when the MU contacts 115 are not being used.

It should further be noted that, as discussed above, the housing 105 may include a predetermined shape in anticipation of coupling to the connector and/or the adapter. The predetermined shape may include, for example, a recess to receive the adapter, a formed configuration around a periphery of the window 120 to receive the connector, etc.

Figure 2A:
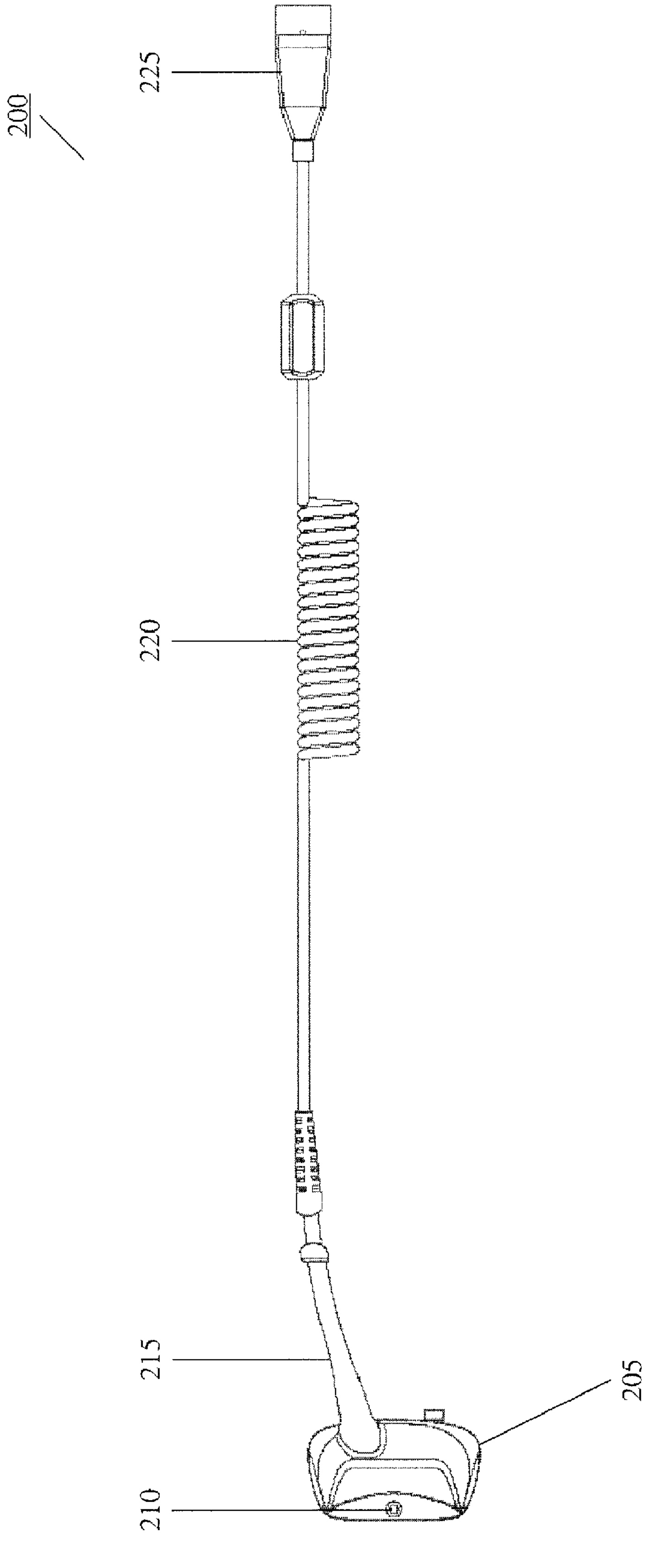
FIG. 2*a* shows an audio output connector that couples to the mobile unit of FIG. 1 according to an exemplary embodiment of the present invention.

FIG. 2*a* shows an audio output connector 200 that couples to the MU 100 of FIG. 1 according to an exemplary embodiment of the present invention. The audio output connector 200 may be designed to exchange multimedia data signals (e.g., audio, video, etc.) between the MU 100 and an audio output device. The audio output device will be explained in further detail with reference to FIG. 5. The audio connector 200 may include a base 205, a corresponding base lock 210, a first portion 215 of a cable, a second portion 220 of the cable, and a jack 225.

The base 205 may be a proximal part of the audio output connector 200 that is configured to couple with the MU 100. As discussed above, the base 105 may couple to a predetermined area of the housing 105 of the MU 100. Specifically, the predetermined area may be around the window 120. Accordingly, an electrical connection may be established between the audio output connector 200 and the MU 100. A periphery of the base 205 may create a flush exterior with the housing 105 of the MU 100 when the base 105 is in a proper orientation with reference to the MU 100. In an exemplary embodiment of the present invention, an outer side of the base 205 may be designed so that connecting devices (e.g., wires) may extend from the base 205 but still maintain a contoured exterior for the assembled MU. For example, the outer side of the base 205 may extend away from the housing 105 of the MU 100 in a predetermined shape. The outer side of the base 205 may further enable a ruggedness feature. For example, the outer side of the base 205 may be manufactured of an elastic material such as rubber, a polymer, other insulating materials, etc.

Figure 2B:
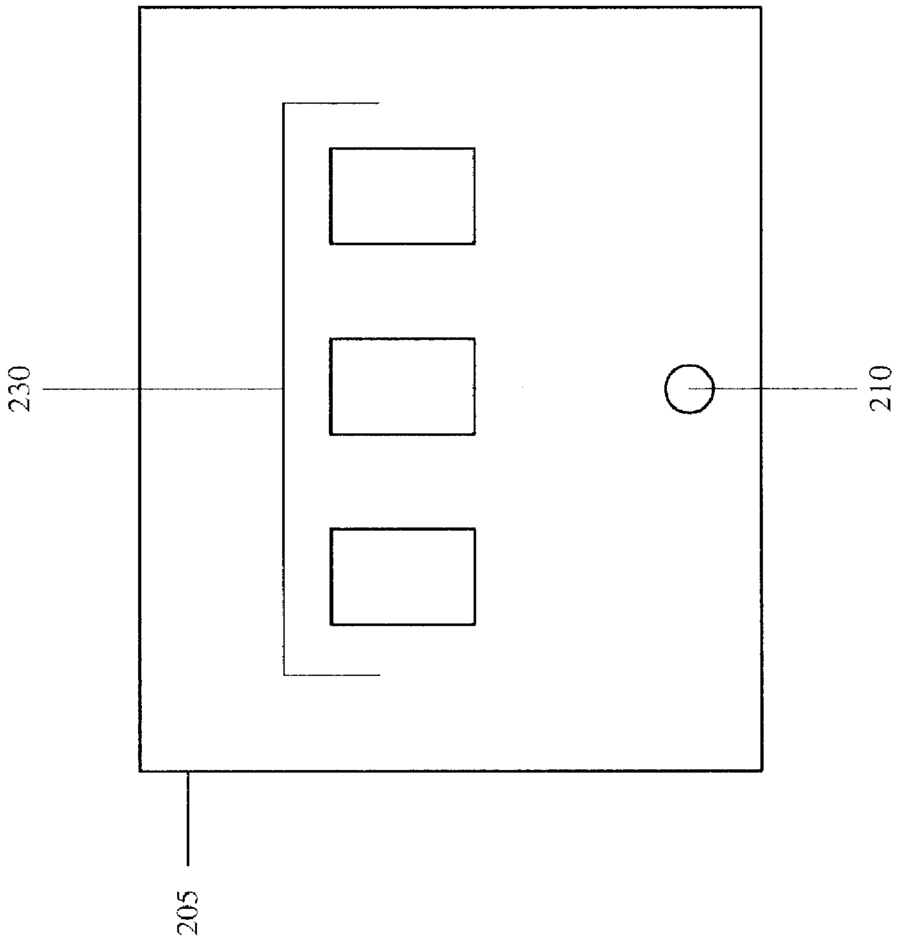
FIG. 2*b* shows a view of a base of the audio output connector of FIG. 2*a* according to an exemplary embodiment of the present invention.

FIG. 2*b* shows a view of the base 205 of the audio output connector 200 of FIG. 2*a* according to an exemplary embodiment of the present invention. Specifically, the view of the base 205 in FIG. 2*b* shows an interior side of the base 205 that faces toward the MU 100 when oriented in a proper configuration. The interior side of the base 205 may further include connector contacts 230.

As discussed above, the MU 100 may include the MU contacts 115 that are exposed through the window 120. The connector contacts 230 may couple to the MU contacts 115 to electrically connect to the MU 100. Thus, when the connector contacts 230 couple to the MU contacts 115, multimedia data such as audio data may be exchanged between the audio output connector 200 and the MU 100. The connector contacts 230 may be any corresponding type of contact with reference to the MU contacts 115. FIG. 1 illustrates that the MU includes three MU contacts 115 while FIG. 2*b* illustrates that the base 205 includes three corresponding connector contacts 230. However, it should be noted that the use of three contacts and the use of all three contacts is only exemplary. For example, the MU may include more or less than three contacts such as six contacts. All of the contacts may be used to establish the connection. In another example, the MU may include contacts that are not used for the electrical connection for the audio functionality. The MU may include six contacts of which only four contacts are used. The base may include only four connector contacts to establish the electrical connection to the predetermined four of the six contacts of the MU.

Returning to FIG. 2*a*, the corresponding base lock 210 may be disposed on the base 205. The corresponding base lock 210 may provide a securing of the base 205 to the MU 100 when coupled in a proper orientation. As discussed above, the MU 100 may include the base lock 110. The corresponding base lock 210 may couple to the base lock 110 to establish the securing. The corresponding base lock 210 may be any corresponding type of locking mechanism with reference to the base lock 110 of the MU 100.

The first portion 215 may be the part of the cable that extends from the base 205. As will be explained in further detail below, the first portion 215 may require a more rugged design that holds the first portion 215 in a locked position. Specifically, the first portion 215 may be part of the audio output connector 200 that runs along an exterior of the housing 105 of the MU 100. Those skilled in the art will understand that such a portion may not be required to exhibit flexibility. The first portion 215 may include part of a set of wires that are used for the exchange of the audio data. The set of wires may include a first end that is coupled to the connector contacts 230. To facilitate the rugged design in a locked position, the first portion 215 may include an insulation material (e.g., rubber, polymer, etc.) surrounding the set of wires. The insulation material may be of a predetermined thickness to ensure damage to the set of wires is prevented and the rugged design is achieved. In a first exemplary embodiment, the first portion 215 may be disposed on the exterior of the housing 105 of the MU 100 to extend beyond the housing 105 a distance that does not impede use of the MU 100. In a second exemplary embodiment, the housing 105 may include a channel that receives the first portion 215 to run therethrough toward a top side of the MU 100.

The second portion 220 may be the part of the cable that extends from the first portion 215 and further extends beyond the housing 105 of the MU 100. The second portion 220 may also be rugged but further be designed for user accommodation. For example, the second portion 220 may include an extendable coil, a flexibility, a retracting mechanism to control a total length of the second portion 220, etc. The second portion 220 may also include the set of wires that are included in the first portion 215. Specifically, the set of wires may span a distance from the connector contacts 230, through the first portion 215, through the second portion 220, and terminate at the jack 225. The second portion 220 may include an insulation material that surrounds the set of wires. However, in contrast to the insulation material of the first portion 220, the insulation material may or may not be of similar components but may provide the user accommodating features discussed above.

The jack 225 may be a distal end of the audio output connector 200. Specifically, according to the exemplary embodiments of the present invention as illustrated in FIG. 2*a*, the jack 225 may be a jack that is received by the audio output device. The jack 225 may include substantially similar contacts as the connector contacts 230 that couple to a corresponding set of contacts of the audio output device. This coupling may establish an electrical connection so that audio data may be exchanged therebetween. In another exemplary embodiment, the jack 225 may already be coupled to circuitry of the audio output device. For example, conventional headsets include a wire extending from one or both sides of speakers to be worn around a user's ears. The wire may be permanently attached to the circuitry. The jack 225 may be in a substantially similar configuration.

Figure 3B:
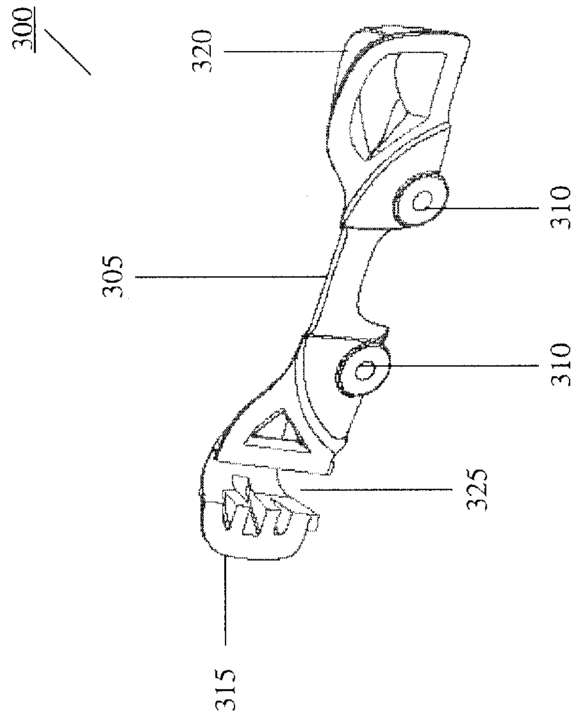
FIG. 3*b* shows a second view of the adapter of FIG. 3*a* according to an exemplary embodiment of the present invention.
Figure 3A:
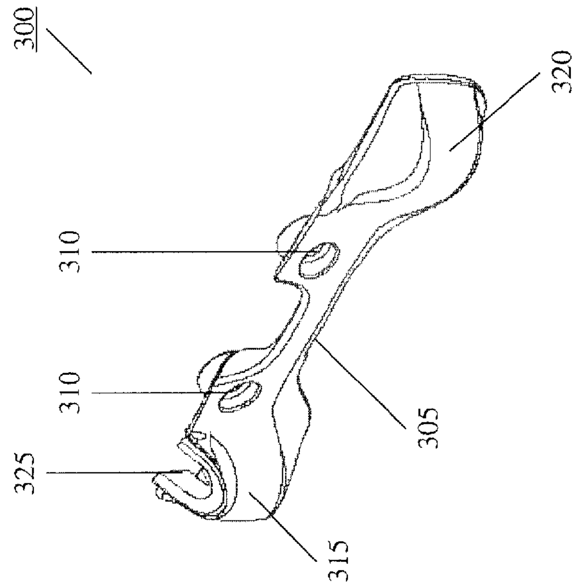
FIG. 3*a* shows a first view of an adapter used with the audio output connector of FIG. 2*a* according to an exemplary embodiment of the present invention.

FIG. 3*a* shows a first view of an adapter 300 used with the audio output connector 200 of FIG. 2*a* according to an exemplary embodiment of the present invention. The adapter 300 may be an additional component to provide support for certain features of the audio output connector 200. Specifically, as will be described in detail below, the adapter 300 may enable a contour design for the MU 100 when the audio output connector 200 is coupled to the MU 100. The adapter 300 may also enable the first portion 215 to be held in place. The adapter 300 may include a shell 305, shell locks 310, and a via 325.

The shell 305 may be coupled to the MU 100 using the shell locks 310. As discussed above, the MU 100 may include the shell locks 125. The shell locks 310 may couple to the shell locks 125 to establish the securing of the adapter 300. The shell locks 310 may be mechanical, electromechanical, etc. The exemplary embodiment illustrated in FIG. 3*a* shows two shell locks 310. The use of two shell locks 310 may prevent a rotational movement that may occur when a force is applied to the shell 305.

An exterior side of the shell 305 may be designed to provide a contour shape when coupled to the MU 100. The contour shape may be a predetermined shape corresponding to a shape of the housing 105 of the MU 100. In a first example, an area of the housing 105 of the MU 100 that the adapter 300 couples may be a substantially flat surface. The adapter 300 may be coupled thereto in a position that extends out of the housing 105. The contour shape may maintain a smooth exterior. In a second example, the housing 105 of the MU 100 may include a recess to receive the adapter 300. The contour shape may create a flush exterior with the rest of the housing 105. The shell 305 may include a first end 315 and a second end 320. The first end 315 may include the via 325. The second end 320 may be hollow and exposed toward an interior side of the shell 305. When the shell 305 is coupled in a proper orientation with the MU 100, the via 325 may form a channel in which the first portion 215 runs therethrough. Thus, the first portion 215 may extend from the base 205, through the via 325, and extend toward a top of the MU 100. Placement of the first portion 215 in the via 325 may prevent movement of the first portion 215.

It should be noted that the use of two shell locks 310 is only exemplary. The exemplary embodiments of the present invention may include less or more shell locks 310. It should also be noted that the shell 305 including the first end 315 and the second end 320 that extend a substantially similar lateral distance of the housing 105 of the MU 100 is only exemplary. For example, the shell 305 may only include the via 325. Accordingly, a single shell lock 310 may be used.

FIG. 3*b* shows a second view of the adapter 300 of FIG. 3*a* according to an exemplary embodiment of the present invention. The second view of the adapter 300 further shows the hollowed out second end 320 and the via 325. As discussed above, the via 325 may form the channel with the housing 105 of the MU 100. The via 325 may be wide enough to snugly hold the first portion 215. For example, if the first portion 215 tapers from the side of the base 205 toward the side of the second portion 220, the via 325 may also taper in a substantially similar manner.

It should be noted that a middle area disposed between the first end 315 and the second end 320 may be raised. As illustrated in the second view of the adapter 300, the middle area may also form a channel with the MU 100. This channel may enable the MU 100 to be wearable. For example, a clip, a strap, etc. may run through this channel so that the MU 100 may be held in a predetermined location on the user's person.

It should also be noted that the use of the adapter 300 is only exemplary. The exemplary embodiments of the present invention may include only the audio output connector 200 coupled to the MU 100. That is, since the adapter 300 may further provide the features already available with the audio output connector 200, the adapter 300 may not be necessary. In the exemplary embodiment that does not include the adapter 300, the first portion 215 may be designed with a firmer material (e.g., polymer) that prevents a movement thereof.

Figure 4:
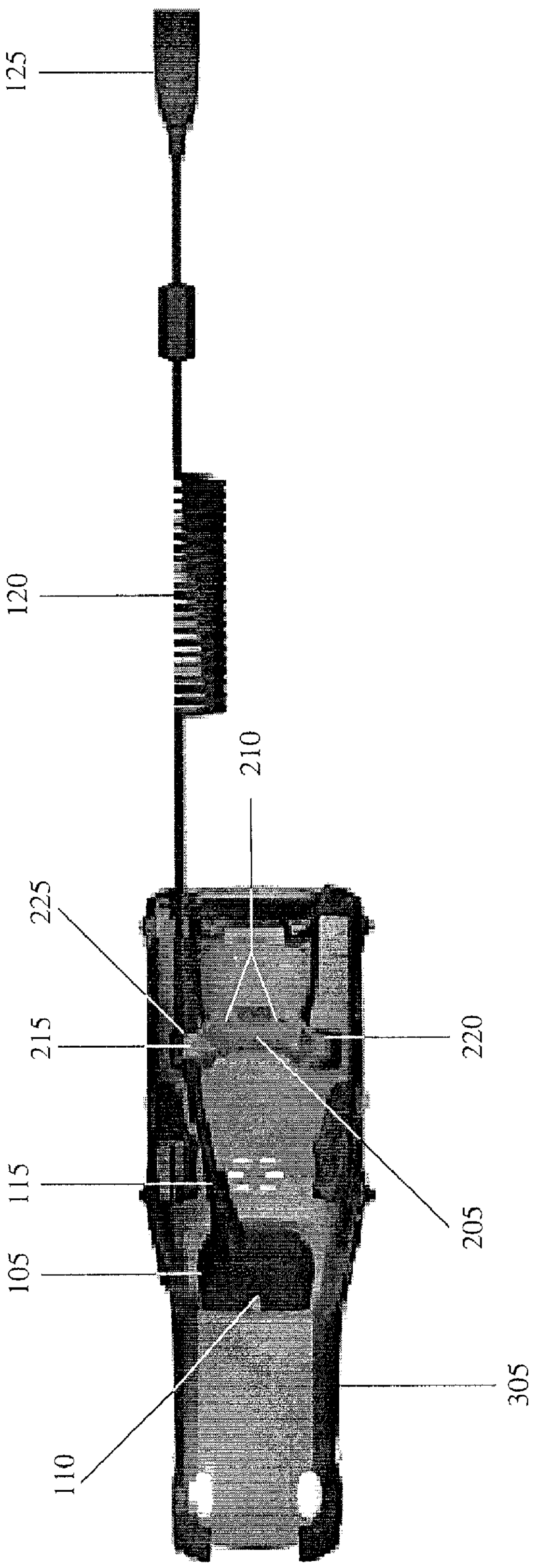
FIG. 4 shows an assembled view where the mobile unit of FIG. 1, the audio output connector of FIGS. 2*a-b*, and the adapter of FIGS. 3*a-b* are coupled according to an exemplary embodiment of the present invention.

FIG. 4 shows an assembled view where the MU 100 of FIG. 1, the audio output connector 200 of FIGS. 2*a-b*, and the adapter 300 of FIGS. 3*a-b* are coupled according to an exemplary embodiment of the present invention. As discussed above, the audio output connector 200 may couple to the MU 100 at the window 120. When assembled in a proper orientation, each of the connector contacts 230 may couple to a respective one of the MU contacts 115, thereby establishing an electrical connection. The audio output connector 200 may be held in place via the corresponding base lock 210 coupling to the base lock 110. The adapter 300 may be coupled to the MU 100 using the shell locks 310 coupling to the adapter locks 125. As illustrated, when coupled in a proper orientation, the first portion 215 may run through the via 325. In a first example, during assembly, the first portion 215 may be placed within the via 325 prior to the locking of the adapter 300. In a second example, the first portion 215 may be placed at an anticipated location in which the via 325 is to be disposed. The adapter 300 may then be locked in so that the first portion 215 is placed in a proper orientation with respect to the via 325. In a third example, the adapter 300 may first be coupled with the MU 100. The first portion 215 may then be threaded through the via 325.

Figure 5:
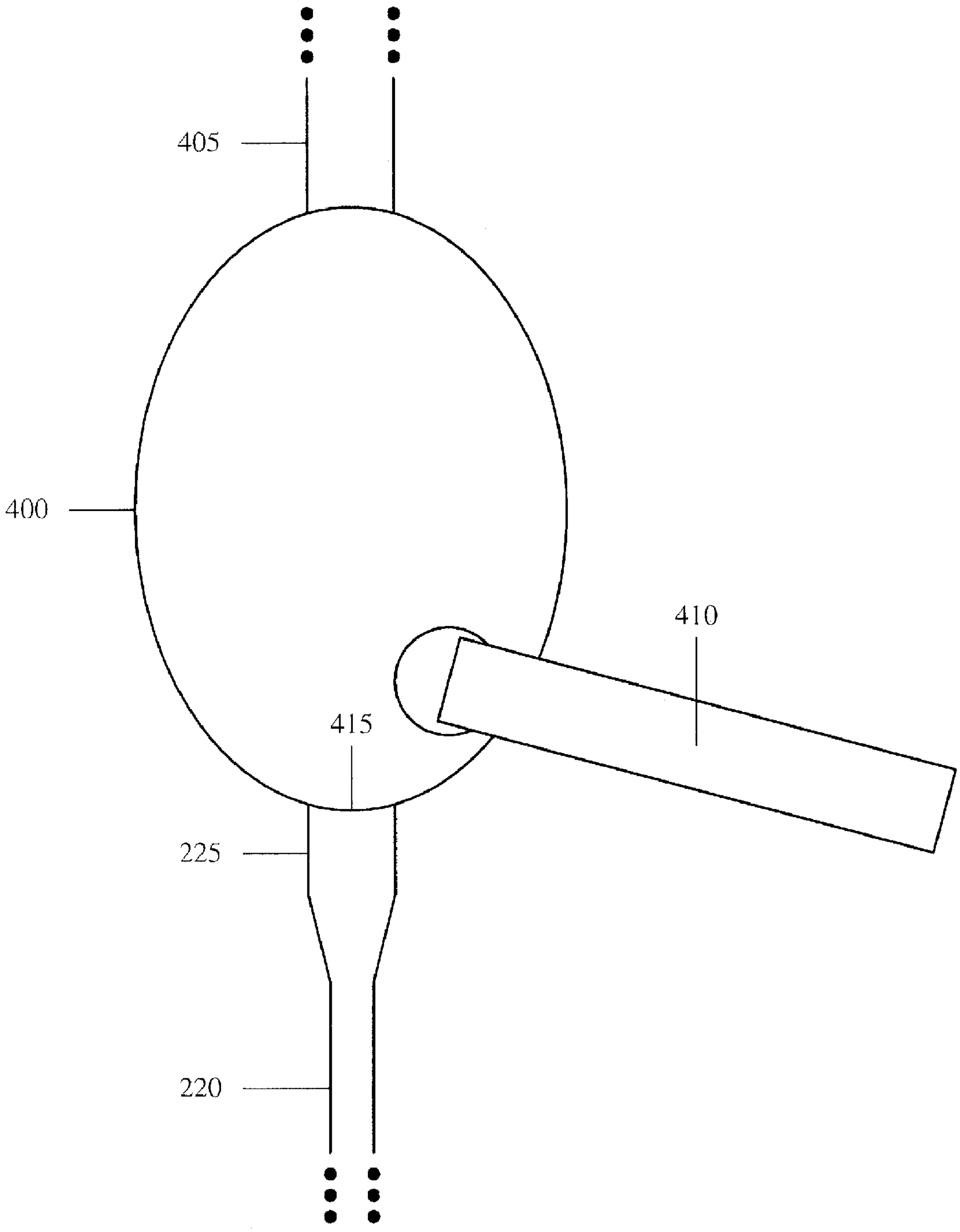
FIG. 5 shows an assembled view where the coupled unit of FIG. 4 further couples to an audio output device according to an exemplary embodiment of the present invention.

FIG. 5 shows an assembled view where the coupled unit of FIG. 4 further couples to an audio output device 400 according to an exemplary embodiment of the present invention. The audio output device 400 may be, for example, a headset. The audio output device 400 may include a headband 405, a boom 410, and a port 415. The headband 405 may enable the audio output device 400 to be worn on a user's head. The boom 410 may be pivotally coupled to enable a rotational movement. A distal end of the boom 410 may include, for example, a microphone to receive a voice input.

As discussed above, the second portion 220 may extend from the first portion 215 that is held in place via the adapter 300. The second portion 220 may include the jack 225 disposed at a distal end. The jack 225 may couple to the port 415. For example, the port 415 may receive the jack 225, thereby coupling respective contacts of the jack 225 and the port 415 to establish an electrical connection. Accordingly, an electrical connection is established between the audio output device 400 and the MU 100.

As discussed above, it should be noted that the audio output device 400 being a separate unit from the audio output connector 200 is only exemplary. The audio output device 400 may be integrally coupled to the audio output connector 200. Thus, the audio output device 400 may not include the port 415. Accordingly, the jack 225 may be permanently connected to a PCB of the audio output device 400.

In a further exemplary embodiment, the audio output connector 200 may include a break away feature that enables predetermined areas to break away. Thus, when an event occurs that may cause a cable stress between the MU and the audio output device, the audio output connector 200 may break away. This may, for example, prevent injury to a user, prevent damage to the MU and/or the audio output device, etc. The predetermined areas that include the break away feature may be, for example, at a distal end of the first portion 215 and the distal end of the second portion 220.

It should be noted that the use of the audio output device 400 is only exemplary. As discussed above, the exemplary embodiments of the present invention may generally be used with any output device for any multimedia data. For example, the output device may include a display. The connection between the MU and the display may exchange video data therebetween.

The exemplary embodiments of the present invention illustrate an assembly of the audio output device 400 to the MU 100 via the audio output connector 200. The exemplary embodiments of the present invention may also illustrate use of the MU 100 without the audio output device 400. For example, when the audio functionality is not required, the audio output connector 200 may be removed. In such an example, the audio output connector 200 may be removably attached to the MU 100 (e.g., the corresponding base lock 210 may decouple from the base lock 110). A cover or lid may subsequently be attached to protect components such as the MU contacts 115. The cover or lid may include a locking mechanism substantially similar to the base lock 110 that couples to the corresponding base lock 210. Furthermore, the adapter 300 may be decoupled from the MU 100 when the shell locks 310 are decoupled from the adapter locks 125.

The exemplary embodiments of the present invention enable an audio functionality to perform without drawbacks associated with conventional connection systems. For example, a direct connection from the audio output connector 200 to the PCB of the MU 100 prevents user induced audio noise such as static from occurring. Thus, a degradation to a quality of a voice application may be prevented. In another example, external mechanical audio interconnects are removed from the assembly procedure. Thus, potential damage to the connecting portions of the assembly may be prevented. Furthermore, when the audio output connector 200 and the adapter 300 are separate components or when the audio output connector 200 and the adapter 300 are incorporated, replacement of broken parts may be performed efficiently. Specifically, the broken part may be removed from the assembly with the MU 100 and replaced with a functioning part without requiring the MU 100 to be disassembled or returned to a service department.

In addition, the exemplary embodiments of the present invention maintain the advantages of conventional audio functionality components. For example, the audio output connector 200 may be flexible to enable a rotational movement substantially similar to a rotational movement of a classic bayonet type jack. In another example, the assembly of the exemplary embodiments of the present invention maintain a ruggedness to prevent possible damage thereto. Finally, the exemplary embodiments of the present invention incorporate the locking mechanisms to hold the components in a respective position. Thus, inadvertent pulling of parts may prevent a break in the audio functionality that is commonly found especially in the classic bayonet type assembly.

It will be apparent to those skilled in the art that various modifications may be made in the present invention, without departing from the spirit or scope of the invention. Thus, it is intended that the present invention cover the modifications and variations of this invention provided they come within the scope of the appended claims and their equivalents.

What is claimed is:

1. An arrangement, comprising:

a housing situating an integrated circuit that includes first contacts, the housing including a window which exposes at least a portion of the first contacts;

a connector including second contacts disposed at a first end of the connector, the second contacts removably coupling to the first contacts, a second end of the connector being coupled to an output device, the connector establishing an electrical connection for an exchange of multimedia data between the integrated circuit and the output device; and, an adapter removably attached to the housing, the adapter including a via that secures a portion between the first and second ends of the connector in a predetermined location.

2. The arrangement of claim 1, wherein the adapter includes a first locking mechanism that is one of mechanical, electrical, and a combination thereof.

3. The arrangement of claim 1, wherein the first end of the connector includes a base disposed over the window, an interior side of the base including the second contacts.

4. The arrangement of claim 3, wherein the base includes a second locking mechanism that is one of mechanical, electrical, and a combination thereof.

5. The arrangement of claim 1, wherein the second end is a jack including a third plurality of contacts.

6. The arrangement of claim 5, wherein the jack is received in a port of the audio output device, the port including a corresponding plurality of contacts for the third plurality of contacts.

7. The arrangement of claim 1, wherein the second end is permanently attached to an internal circuitry of the output device.

8. The arrangement of claim 1, wherein the housing further includes a cover for the window when the connector is detached from the housing.

* * * * *